Dec. 16, 1952        G. A. NEUMAYR        2,621,941
ADJUSTABLE PLATFORM FOR VEHICLES
Filed Aug. 3, 1950        5 Sheets-Sheet 4
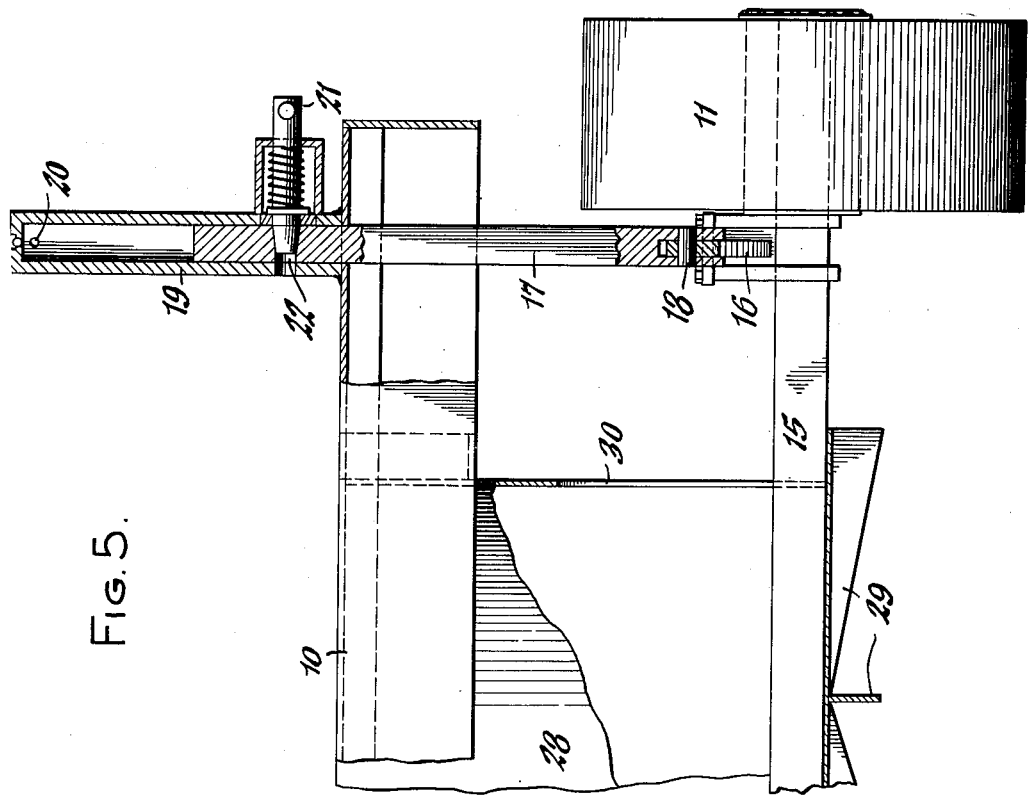
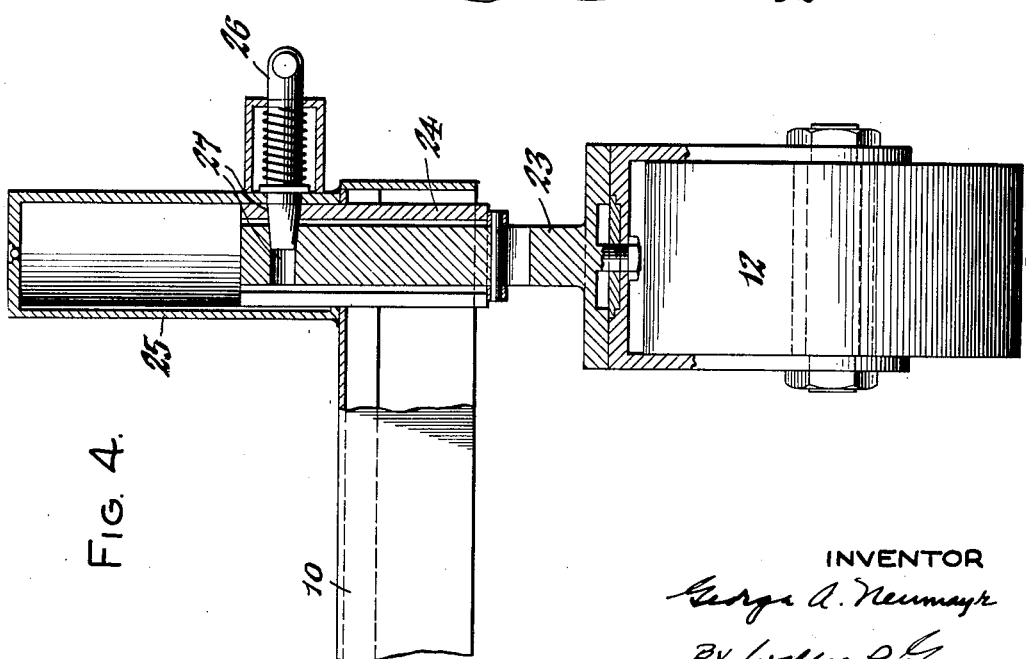
INVENTOR
George A. Neumayr
By Walter P. Geyer
ATTORNEY

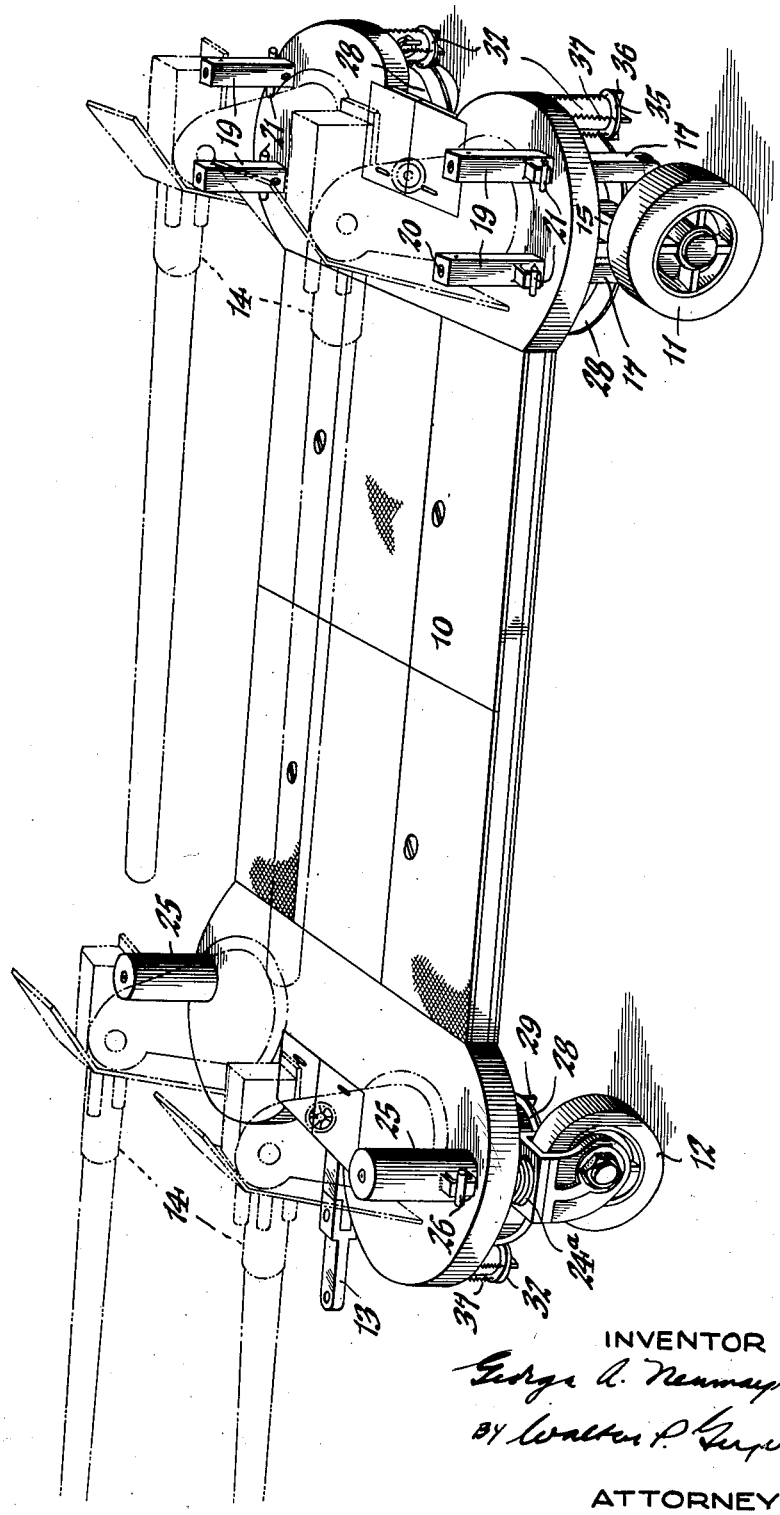

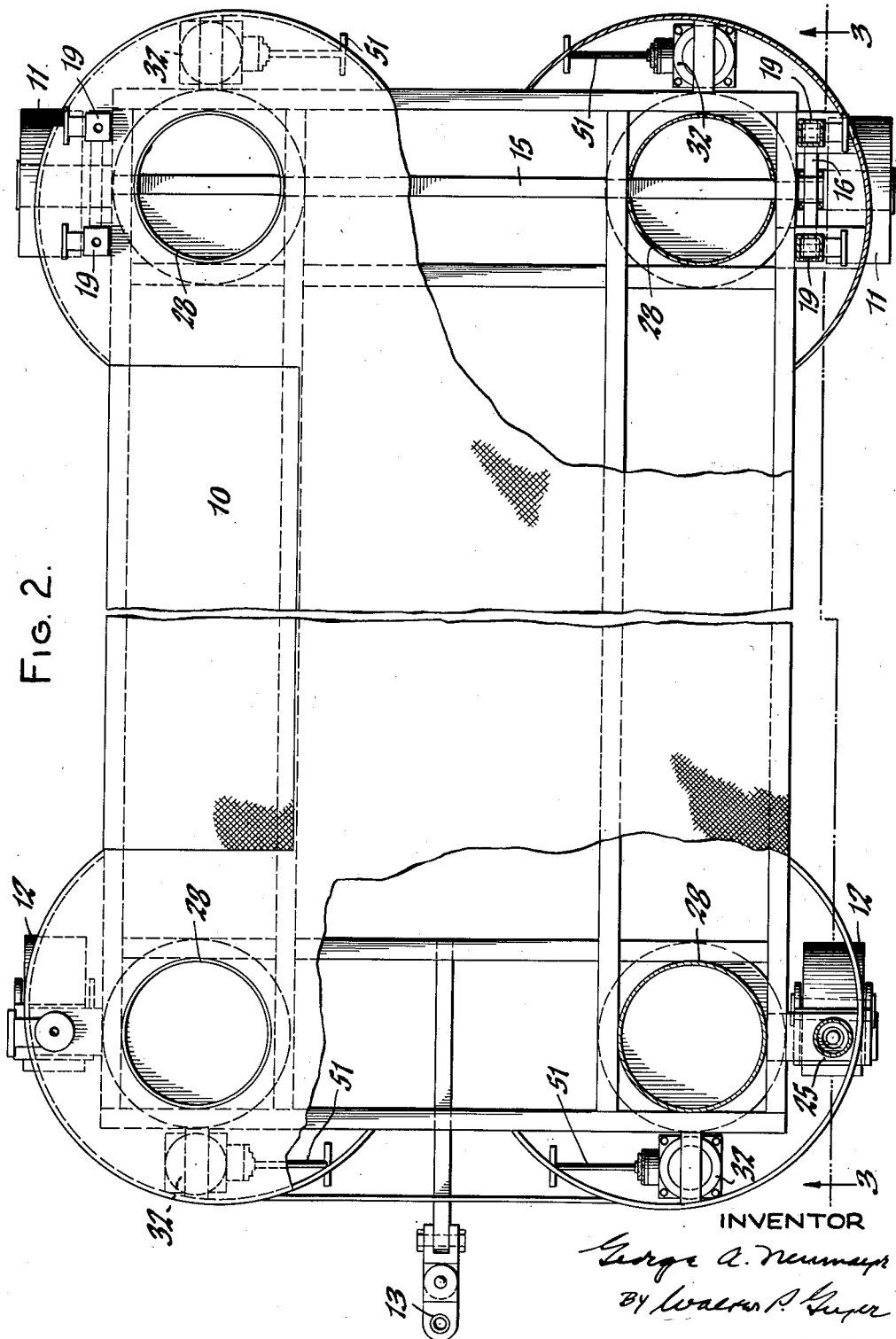

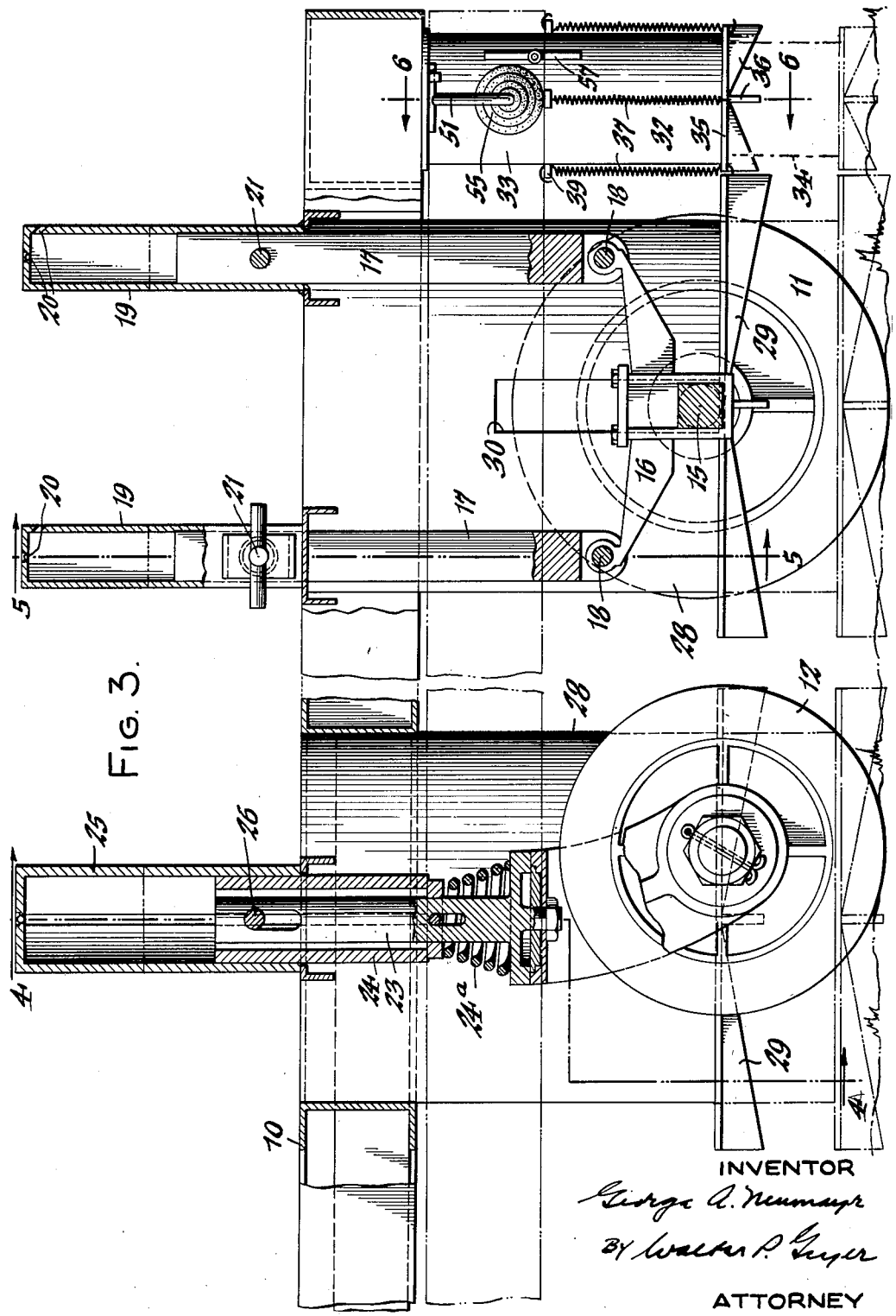

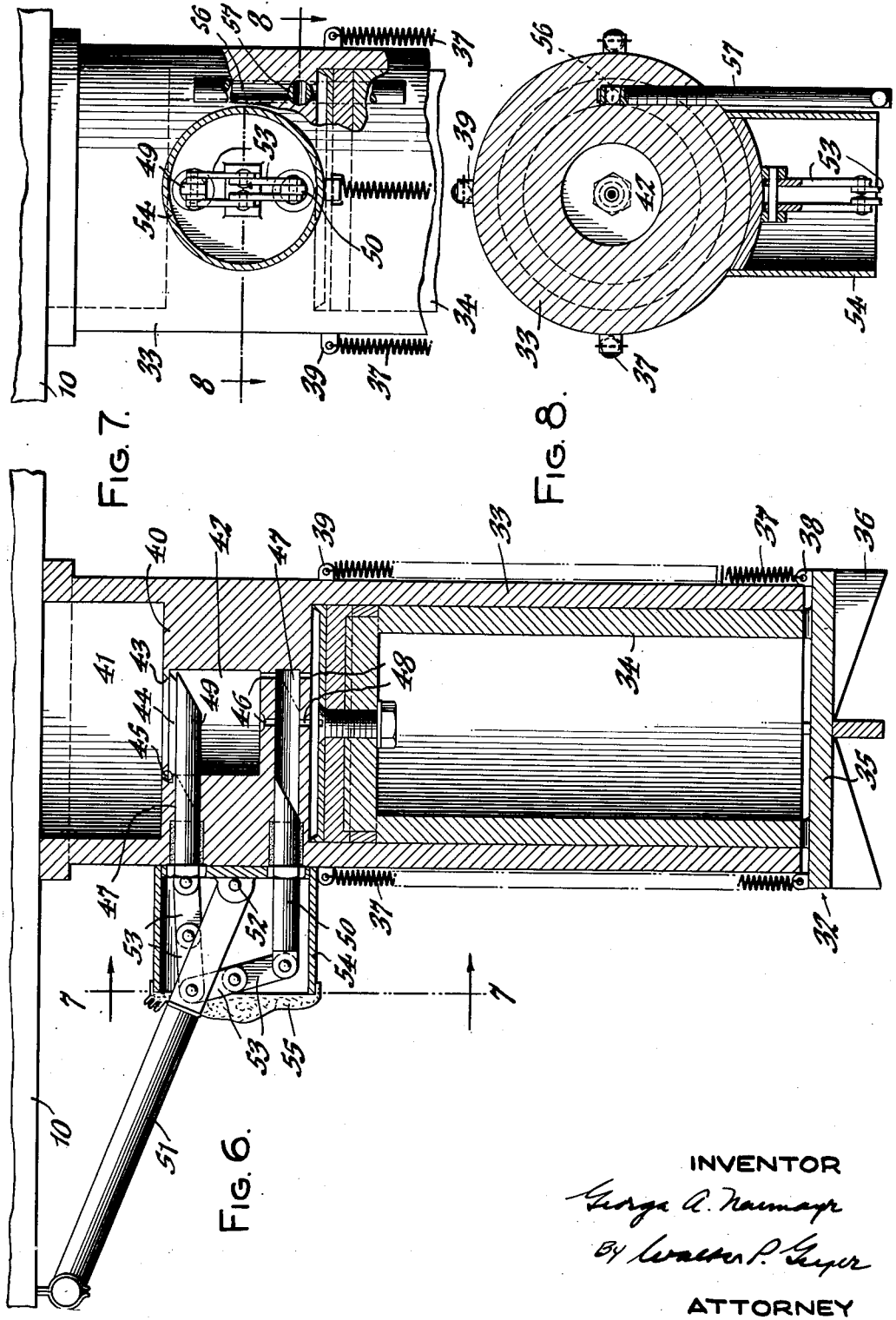

Patented Dec. 16, 1952

2,621,941

UNITED STATES PATENT OFFICE 2,621,941

ADJUSTABLE PLATFORM FOR VEHICLES

George A. Neumayr, Buffalo, N. Y.

Application August 3, 1950, Serial No. 177,459

2 Claims. (Cl. 280—43)

This invention relates generally to certain new and useful improvements in vehicles and particularly to an hydraulically-adjustable platform therefor which may be used as a multiple-gun mount or for facilitating the handling and transportation of loads.

It has for one of its objects to provide a vehicle platform of this character which is so designed and constructed as to facilitate its elevational adjustment in a minimum period of time and to provide stable and effective supports for the platform.

Another object of the invention is to provide simple and inexpensive means for hydraulically governing the elevational adjustment of the platform in a safe and serviceable manner.

Other features of the invention reside in the construction and arrangement of parts hereinafter described and particularly pointed out in the appended claims.

In the accompanying drawings:

Figure 1 is a perspective view of my improved vehicle platform showing the same adapted for use as a multiple gun mount. Figure 2 is a top plan view thereof, partly in section. Figure 3 is an enlarged fragmentary longitudinal section taken on line 3—3, Figure 2. Figures 4 and 5 are fragmentary transverse sections taken on the correspondingly-numbered lines in Figure 3. Figure 6 is an enlarged vertical section taken on line 6—6, Figure 3 showing one of the hydraulic units. Figure 7 is a fragmentary sectional elevation viewed from line 7—7, Figure 6. Figure 8 is a horizontal section taken on line 8—8, Figure 7.

Similar characters of reference indicate corresponding parts throughout the several views.

By way of example, my vehicle platform has been shown as adapted for use as a gun mount, although it is to be understood it is just as adaptable for various and sundry other purposes, particularly in the handling and transportation of loads.

Referring now to the drawings, 10 indicates the adjustable platform of the vehicle which may be of any suitable construction, being suspended at its rear end on axle-supported wheels 11 and at its front end on caster wheels 12, and having a tongue 13 projecting forwardly therefrom for coupling it in tandem relation to a motor driven unit not shown. At its front and rear ends and adjacent the corners thereof the platform has guns or cannons 14 mounted thereon for rotational adjustment about a vertical axis over a 360° range. The rear axle 15 is suitably secured adjacent its ends to leaf springs 16 and rising from the opposite ends of each spring are upright platform-engaging posts or spindles 17 each pivoted at its lower end at 18 to the companion end of the spring and guided at its upper end in telescoping fashion in a cylinder-like housing 19 applied to the top side of the platform and having air vents 20 at its upper end. A spring-urged retractable locking bolt 21 is mounted on each housing for interlocking engagement with a companion opening 22 formed in the upper end of the companion post 17 for releasably supporting the platform in a normally fixed relation to the axle.

Each caster wheel 12 is similarly slidingly connected to the platform and for this purpose its spindle 23 is interfitted in telescoping fashion with a sleeve 24 guided in a companion upright cylindrical housing 25 applied to the platform. A spring-urged retractable locking bolt 26 is mounted on this housing for interlocking engagement with companion registering openings 27 formed in the upper end of the spindle and its sleeve for releasably supporting the platform in a normally fixed relation to the caster wheel. A cushioning spring 24a is interposed between the caster wheel mounting and the sleeve 24.

Depending from the front and rear ends of the platform 10 adjacent the four corners thereof and inwardly alongside and substantially in the axial planes of the caster wheels 12 and the rear wheels 11, respectively, are fixed cylindrical supports or carriers 28 which, when the platform is lowered upon releasing the bolts 21, are adapted to contact the ground and provide a firm and stable support for the platform. At their lower ends each support has radial fins or blades 29 whose bottom edges converge upwardly and inwardly and are adapted to bite into the ground. The diametrically opposite walls of the rear supports have upright slots 30 therein into which the rear axle 15 extends for permitting the vertical displacement of these supports during the elevating movements of the platform relative to the axle. During the mobile movements of the vehicle, the platform assumes the elevated position shown in Figures 1 and 3, with the lower bladed ends of the pendant supports 28 being approximately in the horizontal axial plane of the front and rear wheels to provide sufficient ground clearance.

Means are provided for effecting further elevational adjustments of the platform as may be desired and for this purpose I provide four hydraulic units, indicated generally by the numeral 32, which are preferably disposed alongside the pendant supports 28. These units are identical in construction and each is preferably constructed as follows:

The numeral 33 indicates an outer housing or cylinder depending from the underside of the platform 10 and suitably secured at its upper end thereto, its lower end being open and having a piston 34 operating therein and provided at its lower end exteriorly of the cylinder with a headplate 35 having ground-engaging blades 36 on its bottom side similar to those on the fixed supports 28. Coil springs 37 at the outside of the cylinder and connected at their lower ends to ears 38 formed on the head-plate and at their upper ends to ears 39 formed on the exterior of the cylinder serve to normally urge the piston to its elevated position with its head-plate abutting the bottom edge of the cylinder.

The lowering of the piston 34 in its cylinder 33 to accordingly elevate the platform to the height desired above the ground is effected hydraulically through the medium of a manually-operated pump assembly mounted in the upper portion of the cylinder. To this end the cylinder is provided in its upper end and below the top thereof with a transverse bridge wall or partition 40 forming a fluid reservoir 41 above the same which is adapted for controlled operative communication with the lower portion of the cylinder in which the piston operates. Substantially centrally thereof this bridge wall has a chamber 42 therein whose top side has a port 43 opening into the reservoir and controlled by a vertically-swinging, upwardly-closing flap-like valve 44 pivoted at 45 and whose lower side has ports 46 opening into the lower one of a pair of two parallel plunger-operating bores 47 formed in the bridge wall, such lower bore having ports 48 in its lower side opening into the cylinder 33 above the piston 34, as shown in Figure 6. The control of the fluid from the reservoir to the cylinder to govern the displacement of the piston 34 and accordingly the elevational adjustment of the platform is accomplished by opposing reciprocating plungers 49, 50 guided horizontally in the companion bridge wall bores 47, the upper plunger 49 governing the opening and closing movement of the flap-valve 44 by facial contact therewith and the companion or lower plunger 50 governing the opening and closing of the ports 46, 48. In its inner or forward stroke position shown by dotted lines in Figure 6, the lower plunger 50 closes over the ports 46 and one of the ports 48, leaving the other port 48 open and for this purpose the front end of said plunger is beveled. Reciprocating or pumping motion is transmitted to the plungers by an actuating lever 51 pivoted at 52 to the exterior of the cylinder 33 in a plane between the bores 47 and connected by companion sets of folding links 53 to the companion plungers. A housing 54 encloses these links and the actuating lever protrudes through a flexible cover 55 applied to the open outer end of such housing.

For the purpose of selectively releasing the fluid pressure in the respective cylinders 33 and permitting the lowering of the elevated platform to its normal position, I provide each cylinder with a valve-controlled port 56 which extends through the bridge wall 40 and connects the cylinder with its companion reservoir 41. A valve 57 in the form of a threaded rod is fitted transversely in the cylinder for controlling the port 56.

In the mobile condition of the vehicle, the platform 10 assumes the elevated position shown in Figures 1 and 3, being releasably supported in such position by the locking bolts 21 and 26 associated with the spindle and housing structures 17, 19 and 23, 25, respectively, and with the pendant supports 28 clearing the ground. Should it be desired to render the platform fixed and stable on the ground, the locking bolts are removed to allow the platform to drop by gravity and bring the radial blades of the pendant supports in ground-engaging relation. For effecting further elevational adjustments of the platform as may be desired, the hydraulic units 32 are individually actuated by imparting a pumping motion to the companion levers 51 to cause the pistons 34 of such units to be lowered to the ground and then cause a relative upward displacement of the platform to the selected elevation desired, it being understood that during such elevational adjustments the locking bolts 21 and 26 are released.

I claim as my invention:

1. A vehicle of the character described, comprising front and rear sets of wheels, the rear set of wheels including an axle and suspension springs attached thereto and the front set of wheels being in the form of casters having spindles rising therefrom, a platform having tubular guide members thereon companion to the front and rear wheels, the caster wheel spindles extending into companion guide members for releasable sliding engagement therewith and including cushioning springs associated therewith, and posts rising from the opposite ends of said suspension springs and pivotally connected at their lower ends thereto and fitted at their upper ends in companion guide members for releasable sliding engagement therewith.

2. A vehicle of the character described, comprising front and rear seets of wheels, the rear set of wheels including an axle and suspension springs attached thereto and the front set of wheels being in the form of casters having spindles rising therefrom, a platform having tubular guide members rising therefrom companion to the front and rear wheels, the caster wheel spindles extending into companion guide members for releasable sliding engagement therewith, posts rising from the opposite ends of said suspension springs and pivotally connected at their lower ends thereto and fitted at their upper ends in companion guide members for releasable engagement therewith, ground-engaging supports fixedly pending from the platform in substantially the axial planes of said caster wheels and said rear wheels for sustaining the platform in a non-mobile condition when said spindles and posts are released, and other ground-engaging, vertically-adjustable support pending from the front and rear ends of the platform for elevating it to the position desired, those ground-engaging supports in the axial plane of the rear wheels having slots therein in register with the axle of such rear wheels.

GEORGE A. NEUMAYR.

REFERENCES CITED

The following references are of record in the file of this patent:

UNITED STATES PATENTS

| Number | Name | Date |
|---|---|---|
| 79,571 | Hewitt et al. | July 7, 1868 |
| 1,219,071 | Bodnar | Mar. 13, 1917 |
| 1,310,146 | Schneider | July 15, 1919 |
| 1,636,620 | Berry | July 19, 1927 |
| 1,809,579 | Bryant | June 9, 1931 |
| 2,050,471 | Soulis | Aug. 11, 1936 |
| 2,103,670 | Hammar et al. | Dec. 28, 1937 |
| 2,192,337 | Tiffany | Mar. 5, 1940 |
| 2,313,877 | Joyce | Mar. 16, 1943 |
| 2,443,209 | Thornburg | June 15, 1948 |
| 2,476,825 | Allen | July 19, 1949 |
| 2,480,909 | Davis | Sept. 6, 1949 |
| 2,487,508 | Anderson | Nov. 8, 1949 |
| 2,560,714 | Bill | July 17, 1951 |

FOREIGN PATENTS

| Number | Country | Date |
|---|---|---|
| 911,139 | France | Mar. 4, 1946 |